US009098185B2

(12) United States Patent
Kai et al.

(10) Patent No.: US 9,098,185 B2
(45) Date of Patent: Aug. 4, 2015

(54) DISPLAY DEVICE, AND METHOD AND COMPUTER READABLE MEDIUM FOR THE SAME

(75) Inventors: Takafumi Kai, Nagoya (JP); Tomoko Ikenoue, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 526 days.

(21) Appl. No.: 13/338,127

(22) Filed: Dec. 27, 2011

(65) Prior Publication Data

US 2012/0206498 A1  Aug. 16, 2012

(30) Foreign Application Priority Data

Feb. 15, 2011  (JP) ................................. 2011-029848

(51) Int. Cl.
G09G 5/00 (2006.01)
G06F 3/0488 (2013.01)
G06F 3/0482 (2013.01)
G06F 3/0485 (2013.01)
G06F 3/12 (2006.01)

(52) U.S. Cl.
CPC ............ *G06F 3/0488* (2013.01); *G06F 3/0482* (2013.01); *G06F 3/0485* (2013.01); *G06F 3/1208* (2013.01); *G06F 3/1256* (2013.01); *G06F 3/1285* (2013.01); *G06F 3/1292* (2013.01)

(58) Field of Classification Search
CPC .............. G06F 3/0485; G06F 3/04812; G06F 3/04855; G09G 5/14; G09G 5/346
See application file for complete search history.

(56) References Cited

U.S. PATENT DOCUMENTS

| 8,065,633 | B2 | 11/2011 | Hirose |
| 2006/0109343 | A1* | 5/2006 | Watanabe et al. ............... 348/79 |
| 2007/0061748 | A1 | 3/2007 | Hirose |
| 2007/0206225 | A1 | 9/2007 | Shinohara et al. |
| 2008/0052636 | A1 | 2/2008 | Abe et al. |
| 2008/0092054 | A1 | 4/2008 | Bhumkar et al. |
| 2008/0291474 | A1 | 11/2008 | Hoshino et al. |
| 2009/0063972 | A1 | 3/2009 | Ma et al. |

(Continued)

FOREIGN PATENT DOCUMENTS

| CN | 1932965 A | 3/2007 |
| JP | 63-85925 A | 4/1988 |

(Continued)

OTHER PUBLICATIONS

Chinese Office Action issued in CN application 201210032515.0, issued Jan. 6, 2014.

(Continued)

*Primary Examiner* — Mark Zimmerman
*Assistant Examiner* — Michelle Chin
(74) *Attorney, Agent, or Firm* — Merchant & Gould PC

(57) ABSTRACT

A display device is provided, which includes a display unit configured to display one or more images thereon, an operation unit configured to accept an external operation, and a controller configured to perform a display process to control the display unit to display a plurality of images without concurrently displaying identifiers that are respectively provided to the images, and a scrolling process to, in response to the operation unit accepting a scrolling operation, control the display unit to display the identifiers to be superimposed on the images, respectively, and move the images displayed thereon, together with the identifiers in a direction responsive to the scrolling operation.

15 Claims, 15 Drawing Sheets

(56) References Cited

U.S. PATENT DOCUMENTS

| | | | |
|---|---|---|---|
| 2010/0146435 A1* | 6/2010 | Cros | 715/786 |
| 2011/0064376 A1* | 3/2011 | Morimoto et al. | 386/225 |
| 2011/0227948 A1* | 9/2011 | Ushida | 345/660 |

FOREIGN PATENT DOCUMENTS

| | | |
|---|---|---|
| JP | S63-085925 A | 4/1988 |
| JP | 5-30948 U | 4/1993 |
| JP | H05-030948 U | 4/1993 |
| JP | 7-111618 B | 11/1995 |
| JP | H07-111618 B | 11/1995 |
| JP | 2005-115683 A | 4/2005 |
| JP | 2007-108805 A | 4/2007 |
| JP | 2007-267362 A | 10/2007 |
| JP | 2008-071117 A | 3/2008 |
| JP | 2008-293496 A | 12/2008 |
| JP | 2009-139452 A | 6/2009 |
| WO | 2010/101039 A1 | 9/2010 |

OTHER PUBLICATIONS

Japan Patent Office, Decision of Rejection for Japanese Patent Application No. 2011-029848 (counterpart to above-captioned patent application), dispatched May 28, 2013.

Japan Patent Office, Notification of Reasons for Refusal for Japanese Patent Application No. 2011-029848 (counterpart to above-captioned patent application), dispatched Mar. 12, 2013.

European Patent Office, extended European Search Report for European Patent Application No. 11190989.1 (counterpart European patent application), dated May 2, 2013.

Japan Patent Office, Notification of Reasons for Rejection for Japanese Patent Application No. 2011-029848 (counterpart Japanese patent application), dispatched Mar. 12, 2013.

Office Action issued in related Chinese Patent Application No. 201210032515.0, mailed Sep. 15, 2014.

Office Action issued in related Chinese Patent Application No. 201210032515.0, mailed Mar. 24, 2015.

* cited by examiner

| AAA AAA AAA | PAGE NUMBER : 1 |
| IIIIIII IIIIIII IIIIIII | PAGE NUMBER : 9 |

| BBB BBB BBB | PAGE NUMBER : 2 |
| JJJ JJJ JJJ | PAGE NUMBER : 10 |

| CCC CCC CCC | PAGE NUMBER : 3 |
| KKK KKK KKK | PAGE NUMBER : 11 |

| DDD DDD DDD | PAGE NUMBER : 4 |
| LLL LLL LLL | PAGE NUMBER : 12 |

| EEE EEE EEE | PAGE NUMBER : 5 |
| MMM MMM MMM | PAGE NUMBER : 13 |

| FFF FFF FFF | PAGE NUMBER : 6 |
| NNN NNN NNN | PAGE NUMBER : 14 |

| GGG GGG GGG | PAGE NUMBER : 7 |
| OOO OOO OOO | PAGE NUMBER : 15 |

| HHH HHH HHH | PAGE NUMBER : 8 |

FIG. 3

DISPLAY DEVICE, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2011-029848 filed on Feb. 15, 2011. The entire subject matter of the application is incorporated herein by reference.

BACKGROUND

1. Technical Field

The following description relates to one or more techniques for scrolling a plurality of images.

2. Related Art

So far, a technique has been known, which is adapted to display a plurality of images with a page number shown above each image and to display different images after moving (scrolling) the images and the page numbers in response to acceptance of a scrolling operation.

SUMMARY

However, according to the known technique, since the page number shown above each image occupies a part of a display area of a display unit, each image has to be displayed to be so small as to secure an area for displaying the page number. Thus, in particular, when the display unit has a small display area, there is a problem that it is hard to grasp what each image represents.

Aspects of the present invention are advantageous to provide one or more improved techniques that make it possible to easily grasp contents of displayed images which are not scrolled on a display unit and to easily identify which images are currently displayed while the images are being scrolled on the display unit.

According to aspects of the present invention, a display device is provided, which includes a display unit configured to display one or more images thereon, an operation unit configured to accept an external operation, and a controller configured to perform a display process to control the display unit to display a plurality of images without concurrently displaying identifiers that are respectively provided to the images, and a scrolling process to, in response to the operation unit accepting a scrolling operation, control the display unit to display the identifiers to be superimposed on the images, respectively, and move the images displayed thereon, together with the identifiers in a direction responsive to the scrolling operation.

According to aspects of the present invention, further provided is a method configured to be implemented on a processor coupled to a display unit configured to display one or more images thereon and an operation unit configured to accept an external operation, the method including a display process to control the display unit to display a plurality of images without concurrently displaying identifiers that are respectively provided to the images, and a scrolling process to, in response to the operation unit accepting a scrolling operation, control the display unit to display the identifiers to be superimposed on the images, respectively, and move the images displayed thereon, together with the identifiers in a direction responsive to the scrolling operation.

According to aspects of the present invention, further provided is a non-transitory computer readable medium storing instructions that, when executed by a processor coupled to a display unit configured to display one or more images thereon and an operation unit configured to accept an external operation, cause the processor to perform a display process to control the display unit to display a plurality of images without concurrently displaying identifiers that are respectively provided to the images, and a scrolling process to, in response to the operation unit accepting a scrolling operation, control the display unit to display the identifiers to be superimposed on the images, respectively, and move the images displayed thereon, together with the identifiers in a direction responsive to the scrolling operation.

BRIEF DESCRIPTION OF THE ACCOMPANYING DRAWINGS

FIG. 1 schematically shows a mobile phone communicably connected with a printer in a first embodiment according to one or more aspects of the present invention.

FIG. 2 is a block diagram showing an electrical configuration of the mobile phone in the first embodiment according to one or more aspects of the present invention.

FIG. 3 exemplifies contents of each page of a PDF document in the first embodiment according to one or more aspects of the present invention.

FIG. 4 schematically exemplifies an image displayed on a screen of a display unit of the mobile phone by a display program in the first embodiment according to one or more aspects of the present invention.

FIG. 5 schematically illustrates a display process to display thumbnail images on the screen in the first embodiment according to one or more aspects of the present invention.

Figure 14:
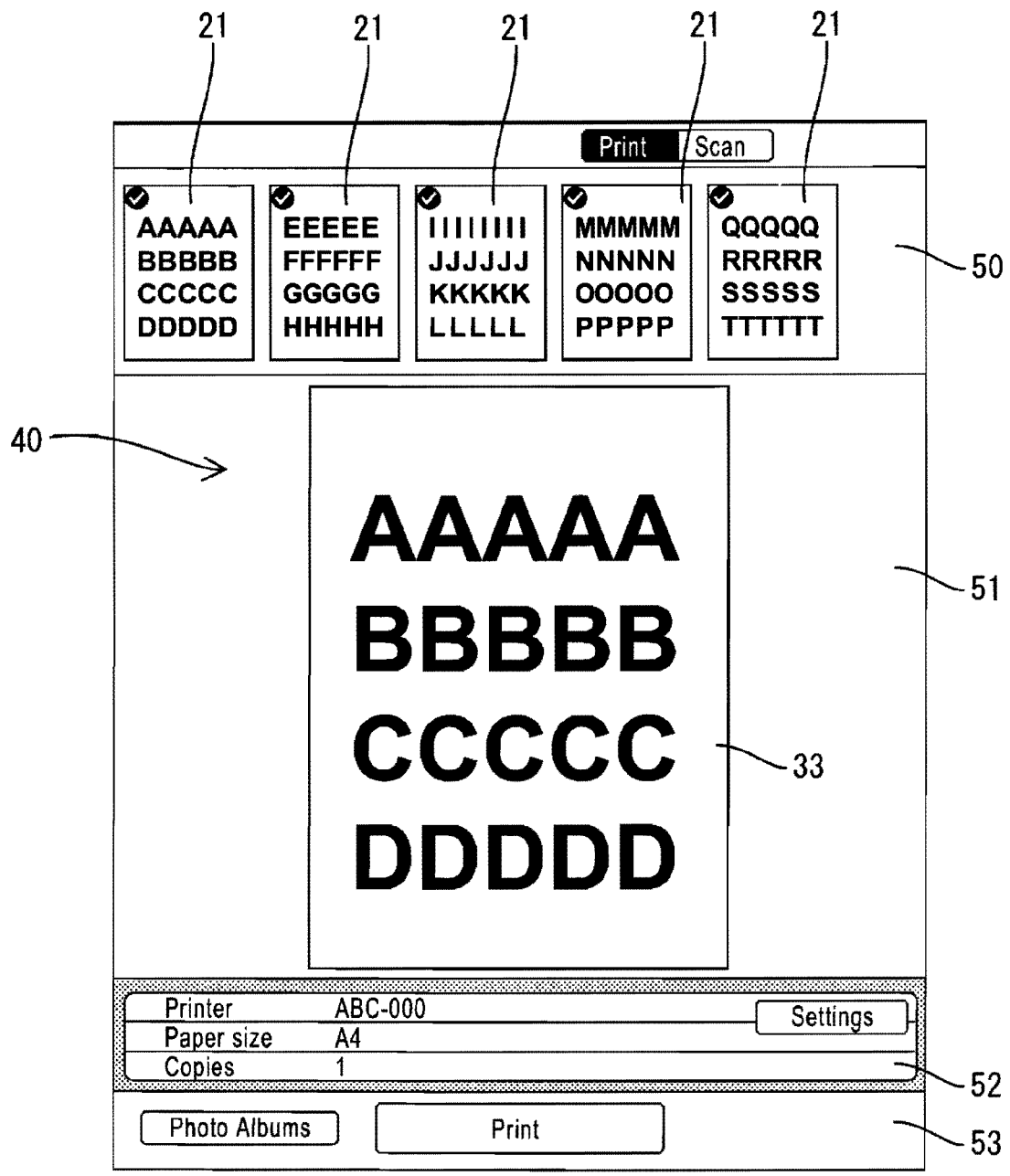

FIG. 14 exemplifies an image displayed on a screen of a display unit of a tablet personal computer in a third embodiment according to one or more aspects of the present invention.

Figure 15:
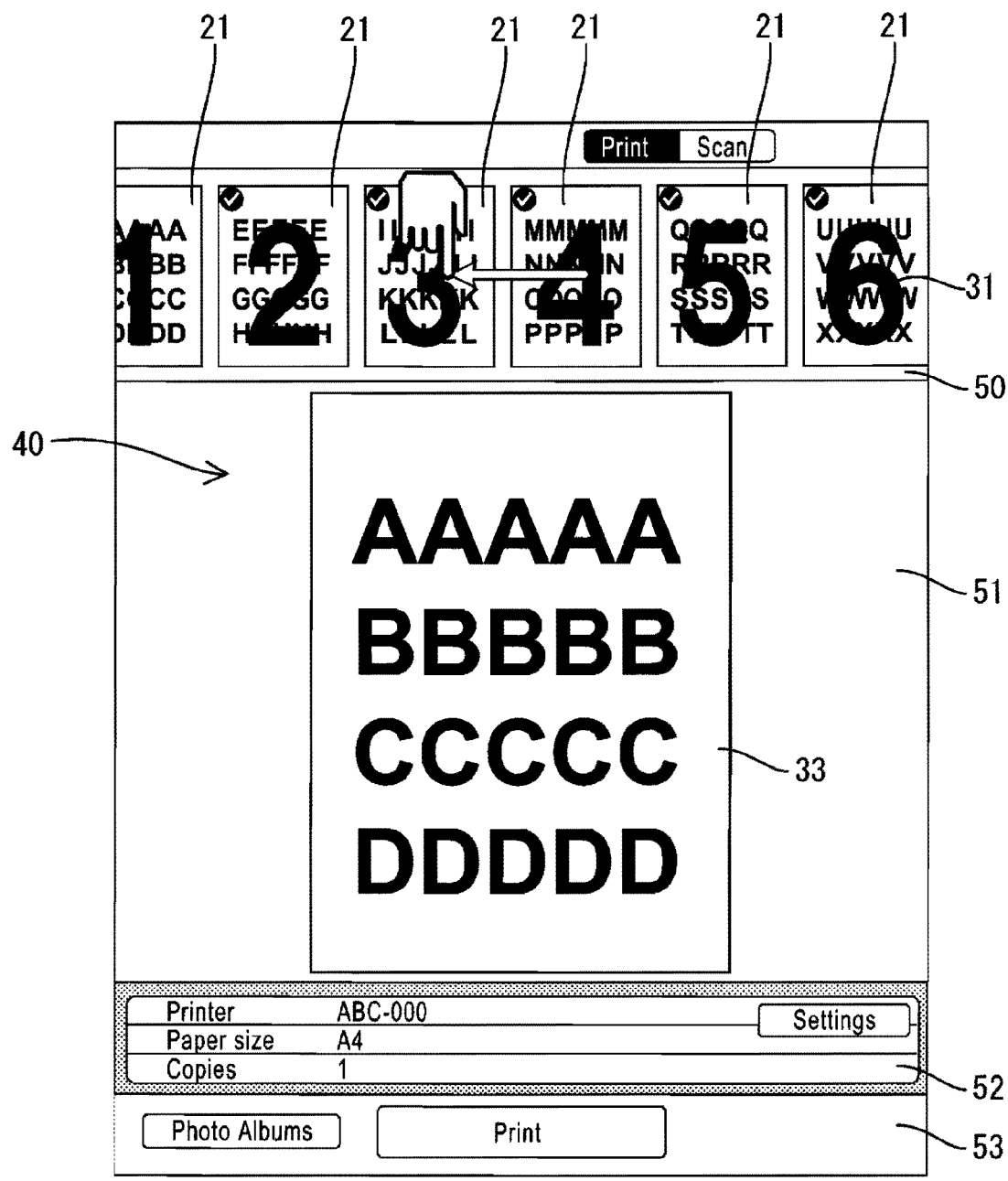

FIG. 15 is an illustration for explaining a scrolling process to scroll the thumbnail images displayed on the screen in the third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompanying drawings.

<First Embodiment>

(1) Overall Configuration

Figure 1:
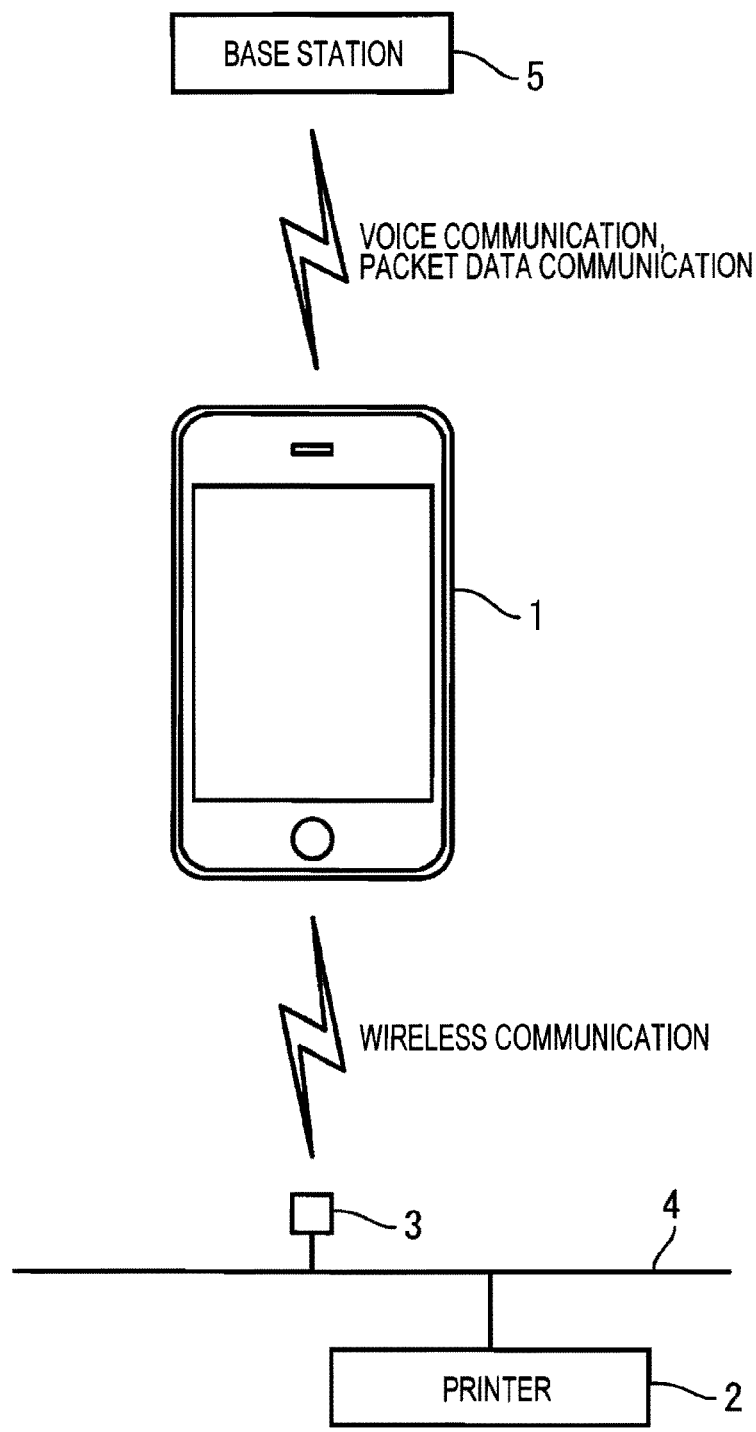

FIG. 1 schematically shows a mobile phone 1 of a first embodiment and a printer 2 communicably connected with the mobile phone 1. The mobile phone 1 has a wireless communication function as well as a voice communication function. Specifically, the mobile phone 1 is configured to establish a wireless connection with a communication network 4 such as a LAN (Local Area Network) and the Internet via a wireless LAN router 3. Further, the mobile phone 1 is configured to send a print instruction to the printer 2 via the communication network 4 and cause the printer 2 to print an image.

(2) Electrical Configuration of Mobile Phone

Figure 2:
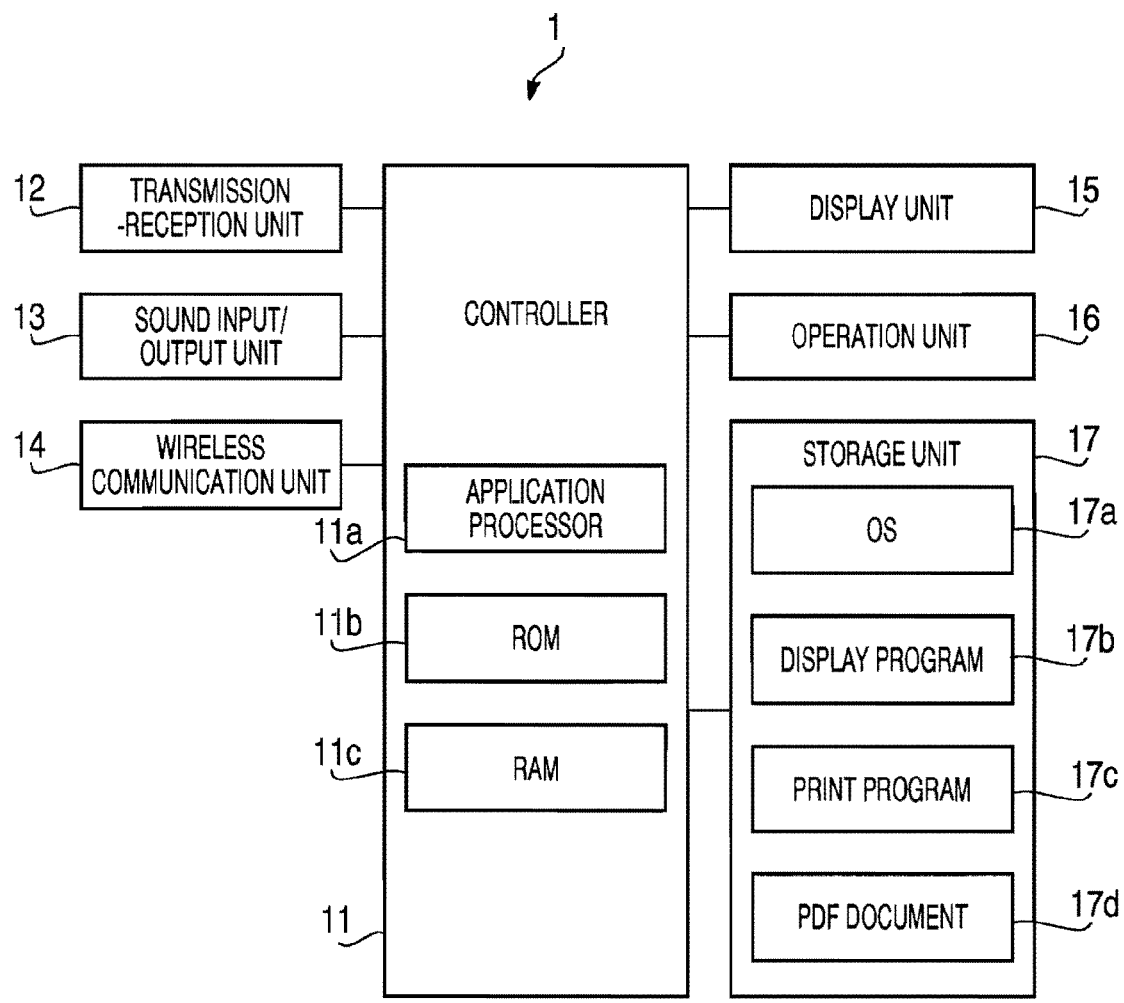

As shown in FIG. 2, the mobile phone 1 includes a controller 11, a transmission-reception unit 12, a sound input/output unit 13, a wireless communication unit 14, a display unit 15, an operation unit 16, and a storage unit 17.

The controller 11 includes an application processor 11a, a ROM 11b, and a RAM 11c. The application processor is configured to execute various programs stored on the ROM 11b and the storage unit 17 to control each element of the mobile phone 1. The ROM 11b stores various kinds of data and programs to be executed by the application processor 11a. The RAM 11c is used as a main memory by the application processor 11a when the application processor 11a performs various kinds of processes.

The transmission-reception unit 12 includes an antenna, an RF (Radio Frequency) circuit, and a base-band processor. The transmission-reception unit 12 is configured to transmit/receive audio signals to/from a base station 5 via the antenna. Further, the transmission-reception unit 12 is configured to perform packet data communication with the base station 5.

The sound input/output unit 13 includes a microphone, a speaker, and an audio processing circuit. An audio signal input via the microphone is transmitted to the base station 5 by the transmission-reception unit 12. Further, an audio signal received from the base station 5 by the transmission-reception unit 12 is output as sound from the speaker.

The wireless communication unit 14 is configured in conformity with Wi-Fi (trademark registered) to be wirelessly connected with the communication network 4 via the wireless LAN router 3. It is noted that the wireless communication standard for the wireless communication unit 14 is not limited to Wi-Fi, but may include any wireless communication standard that makes it possible to establish a wireless connection between the mobile phone 1 and the communication network 4. For example, the mobile phone 1 may be configured to be wirelessly connected with the communication network 4 based on Bluetooth (trademark registered) or via infrared communication using an infrared ray such as IrDA. Further, the mobile phone 1 may be connected with the communication network 4 in a wired manner. Furthermore, the mobile phone 1 may be configured to be directly connected with the printer 2 without involving the communication network 4.

The display unit 15 includes a display device such as a liquid crystal display device and an organic EL display device, and a drive circuit for driving the display device. The operation unit 16 includes a substantially transparent touch panel that covers a display surface of the display device, a control circuit for controlling the touch panel, and various kinds of operation buttons. A user is allowed to input a telephone number or operate an application program by operating the operation unit 16.

The storage unit 17 is configured with a non-volatile memory such as a flash memory to store various kinds of programs and data. The storage unit 17 stores an operating system (OS) 17a, application programs (such as a display program 17b and a print program 17c), and an electronic document to be displayed by the display program 17b.

The data format for the electronic document may include PDF (Portable Document Format), a data format specific to a word processor, and other data formats. In the first embodiment, PDF is applied as a data format for the electronic document. In the following description, the electronic document will be referred to as the PDF document 17d.

Further, the first embodiment will be set forth based on an example of the PDF document 17d as shown in FIG. 3. The PDF document 17d shown in FIG. 3 includes a plurality of pages each of which includes a plurality of letters of a specific kind of alphabets A to O. Each page is attached with a page number assigned sequentially in the order from one.

(3) Display Program

Figure 4:
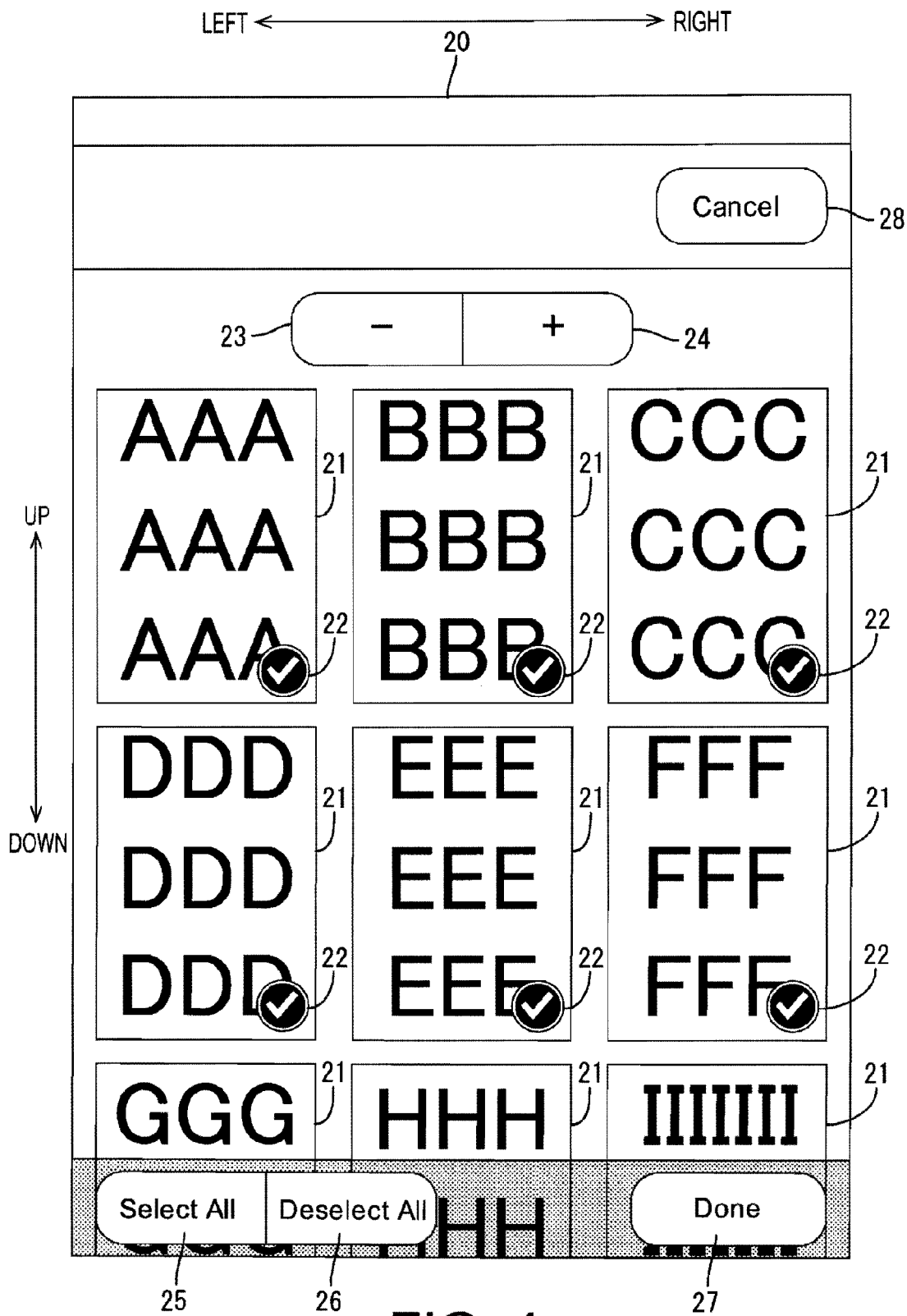

FIG. 4 schematically exemplifies an image displayed on a screen 20 of the display unit 15 by the display program 17b. The display program 17b is configured to create thumbnail images 21 each of which indicates contents of a corresponding one of pages of the PDF document 17d, display a list of the created thumbnail images 21 on the screen 20, and allow the user to select a thumbnail image 21 for a desired page to print from the listed thumbnail images 21.

When a thumbnail image 21 is selected on the screen 20, the controller 11 executing the display program 17b (hereinafter, referred to as "the display program 17b") issues to the print program 17c an instruction to print the page corresponding to the selected thumbnail image 21. In response to the instruction issued by the display program 17b, the controller 11 executing the print program 17c (hereinafter, referred to as "the print program 17c") controls the printer 2 to print the page.

A circular image 22 shown on each thumbnail image 21 is a selection mark that denotes that the thumbnail image 21 with the image 22 shown thereon is selected. When the thumbnail image 21 with the selection mark 22 shown thereon is touched, the touched thumbnail image 21 is deselected and the selection mark 22 is rendered unshown. Meanwhile, when the thumbnail image 21 with no selection mark 22 shown thereon is touched, the touched thumbnail image 21 is selected and the selection mark 22 is rendered shown thereon.

The default state of each thumbnail image 21 is a selected state. Therefore, the selection mark 22 is shown on each thumbnail image 21 immediately after the display program 17b is launched.

A "− (minus)" button 23 is a button to reduce the size of each thumbnail image 21 by one level. A "+ (plus)" button 24 is a button to enlarge the size of each thumbnail image 21 by one level.

A "Select All" button 25 is a button for collectively selecting all the thumbnail images 21 (which include thumbnail images 21 not shown on the screen 20). A "Deselect All" button 26 is a button for deselecting all the thumbnail images 21 collectively.

A "Done" button 27 is a button for instructing the print program 17c to print the page(s) corresponding to the selected thumbnail image(s) 21 and thereafter terminating the display program 17b. A "Cancel" button 28 is a button for terminating the display program 17b without performing image printing.

(3-1) Displaying of Thumbnail Images

Figure 5:
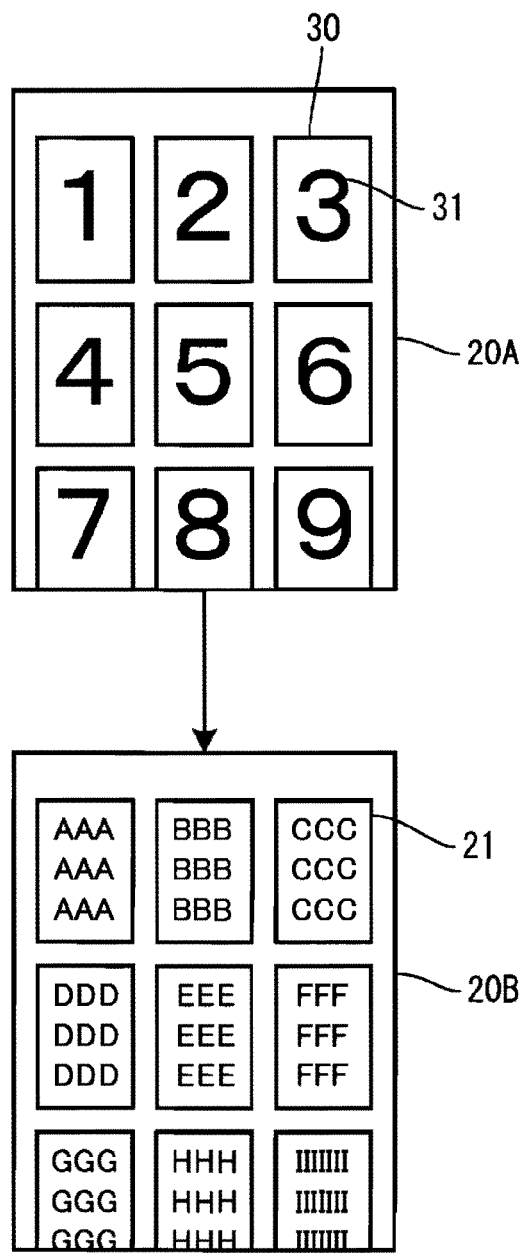

FIG. 5 schematically illustrates a display process to display the thumbnail images 21 on the screen 20. Namely, FIG. 5 shows a time-series change of images on the screen 20 immediately after the display program 17b is launched. After the display program 17b is launched, firstly display area images 30 and page numbers 31 are displayed on the screen 20. Thereafter, the thumbnail images 21 are displayed on the screen 20 to replace the display area images 30 and the page numbers 31. It is noted that, in a screen image 20A on the screen 20 (hereinafter, simply referred to as the "screen 20A"), the reference character "30" is attached only to one of the display area images 30 for the sake of simplified illustration. Further, the reference character "31" is attached only to one of the page numbers 31.

Specifically, when the display program 17b is launched, as shown on the screen 20A, the display area images 30 are displayed each of which indicates an area where a corresponding thumbnail image 21 is to be displayed. The display area image 30 may be a frame indicating an outline of the area where the thumbnail image 21 is to be shown, an image of a lower resolution than the thumbnail image 21, or an image filled with a different color from colors for the page numbers and the background of the screen 20. As the display area images 30, FIG. 5 exemplifies frames displayed on the screen 20A each of which indicates an outline of the area where a thumbnail image 21 is to be shown. The size of the display area image 30 is previously set depending on the numbers of lines and columns for the thumbnail images 21 to be displayed concurrently on the screen 20.

Further, on each display area image 30, a page number 31 is shown in a superimposed manner, which is of a page corresponding to the thumbnail image 21 to be displayed in the area indicated by the display area image 30. As shown in FIG. 5, each page number 31 is shown within the area indicated by the corresponding display area image 30. In other words, each page number 31 is shown not to run off the edge of the area indicated by the corresponding display area image 30. It is noted that the display area image 30 and the page number 31 do not necessarily have to be displayed as separate images. Namely, the display area image 30 and the page number 31 may be displayed as a single combined image.

While the display area images 30 and the page numbers 31 are being displayed, a thumbnail image 21 is created from each page by the display program 17b. Then, after the thumbnail images 21 are completely created, the display area images 30 and the page numbers 31 are rendered unshown, and as shown on a screen 20B, the thumbnail images 21 are displayed in respective areas where the display area images 30 had been shown. At this time, the page numbers 31 are not displayed. It is noted that, on a screen 20B, the reference character "21" is attached only to one of the thumbnail images 21 for the sake of simplified illustration. The thumbnail image 21 is displayed with the maximum size displayable within the area indicated by the display area image 30 without changing an aspect ratio of the thumbnail image 21 (i.e., to maintain the same aspect ratio as that of the original thumbnail image 21).

Figure 6:
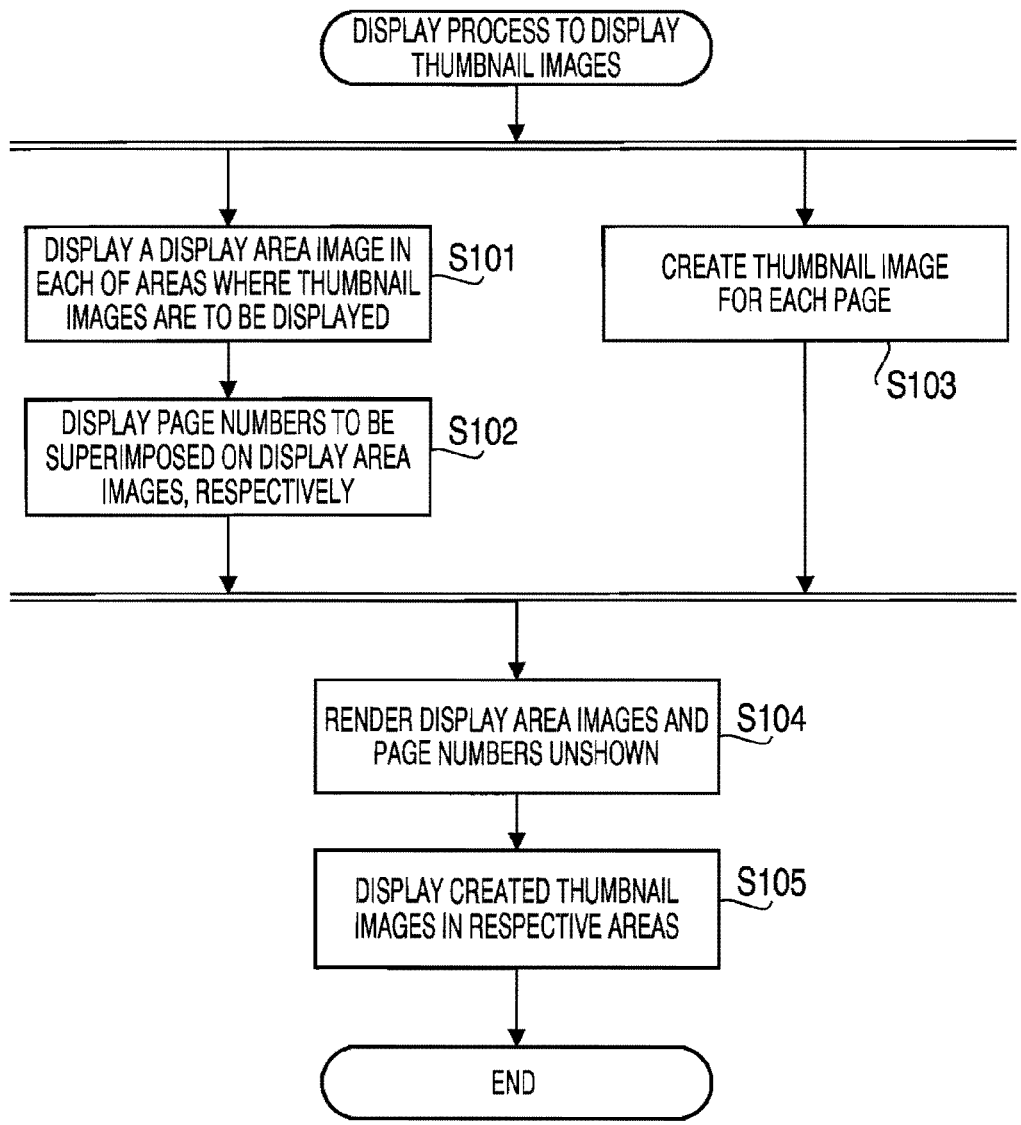
FIG. 6 is a flowchart showing a procedure of the display process to display the thumbnail images in the first embodiment according to one or more aspects of the present invention.

FIG. 6 is a flowchart showing a procedure of the display process to display the thumbnail images 21. The process is started in response to the display program 17b being launched. The display program 17b of the first embodiment is installed as a multi-thread program, so as to perform a plurality of operations in parallel.

In S101, the display program 17b (the controller 11) displays the display area image 30 in each area where the thumbnail image 21 is to be displayed. In S102, the display program 17b displays the page number 31 to be superimposed on each display area image 30.

In S103, the display program 17b creates the thumbnail image 21 corresponding to each page in parallel with S101 and S102. It is noted that when the display program 17b is a single-thread program, the display program 17b performs S103 after completely executing S101 and S102.

In S104, the display program 17b makes the display area images 30 and the page numbers 31 unshown. In S105, the display program 17b displays the thumbnail images 21 created in S103 in the respective areas on the screen 20. Meanwhile, at this time, the display program 17b does not display the page numbers 31.

(3-2) Scrolling of Thumbnail Images

Figure 7:
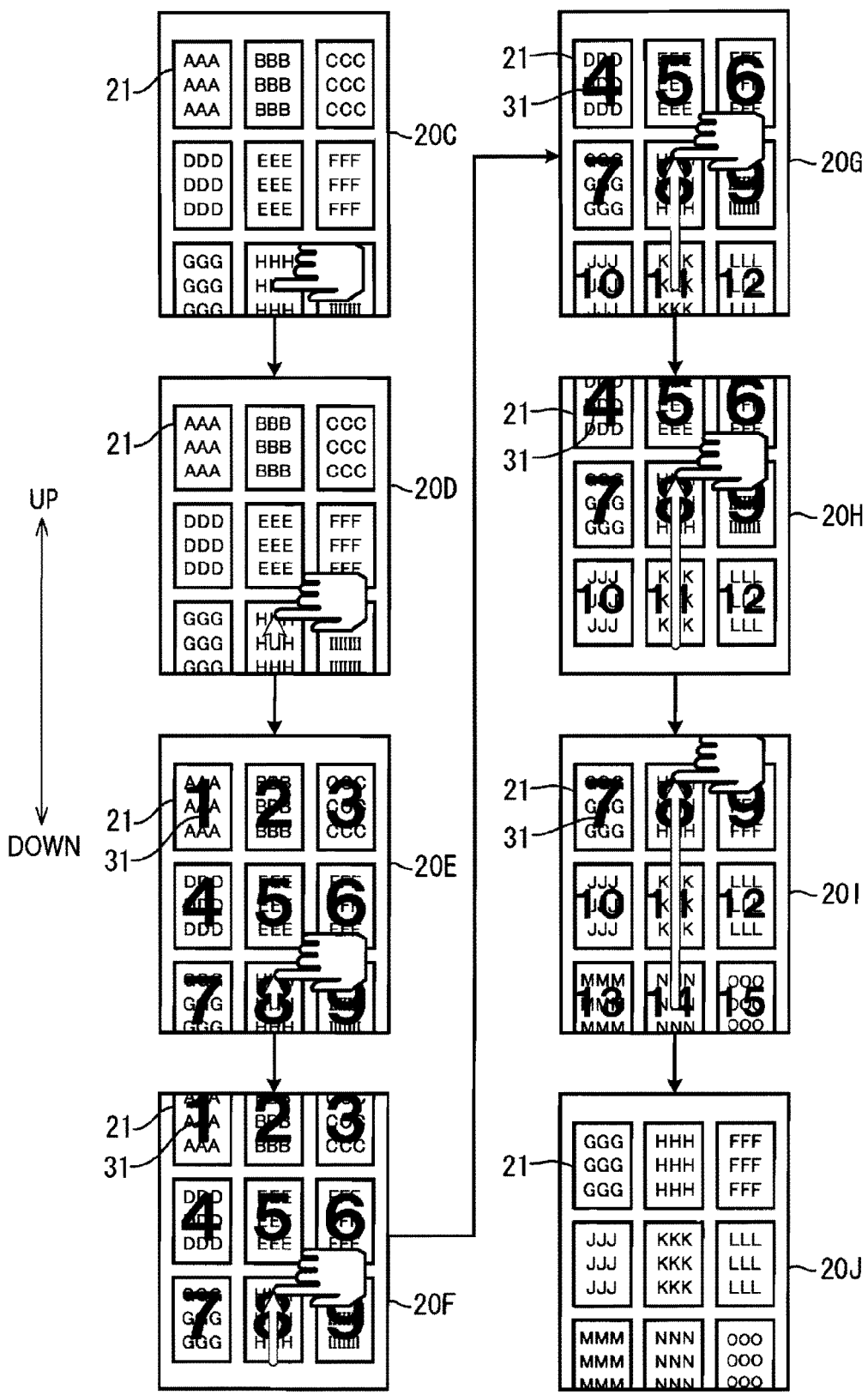
FIG. 7 is an illustration for explaining a scrolling process to scroll the thumbnail images displayed on the screen in the first embodiment according to one or more aspects of the present invention.

FIG. 7 schematically illustrates a scrolling process to scroll the thumbnail images 21 displayed on the screen 20, i.e., time-series changes of images on the screen 20 while the thumbnail images 21 are being scrolled. When the PDF document 17d has a lot of pages, a part of the thumbnail images 21 is displayed on the screen 20. When a part of the thumbnail images 21 is displayed on the screen 20, the user is allowed to scroll the thumbnail images 21 up and down by moving up and down his (her) finger touching the touch panel. Thereby, the user is allowed to display all the thumbnail images. The following descriptions exemplify a case where the user's finger is moved up.

It is noted that, as will be described in detail, scrolling in the horizontal direction is allowed only in the case where the thumbnail images 21 are enlarged such that only one thumbnail image 21 is displayable on the screen 20. In the other cases, only scrolling in the vertical direction is possible.

As shown on a screen 20D, when the user's finger moves up, an upward scrolling operation is accepted, and the thumbnail images 21 moves up as shown on screens 20E to 20I. The thumbnail images 21, which had been displayed until then, are rendered unshown, and different thumbnail images 21 are newly displayed on the screen 20. When the user's finger stops or gets away from the touch panel, the scrolling operation is terminated to stop the movement of the thumbnail images 21. In the example shown in FIG. 7, the user's finger stops in a position shown on the screen 20I.

According to the display program 17b of the first embodiment, when the scrolling operation is accepted, as shown on the screen 20E, each thumbnail image 21 has a page number displayed thereon in a superimposed manner, which page number is of a page corresponding to the thumbnail image 21. Then, as shown on the screens 20F to 20I, the displayed page numbers 31 move together with the thumbnail images 21.

When the different thumbnail images 21 are newly displayed to replace the thumbnail images 21 that had been displayed until then, page numbers 31 are displayed on the newly displayed thumbnail images 21 while moving together with the newly displayed thumbnail images 21.

Figure 8:
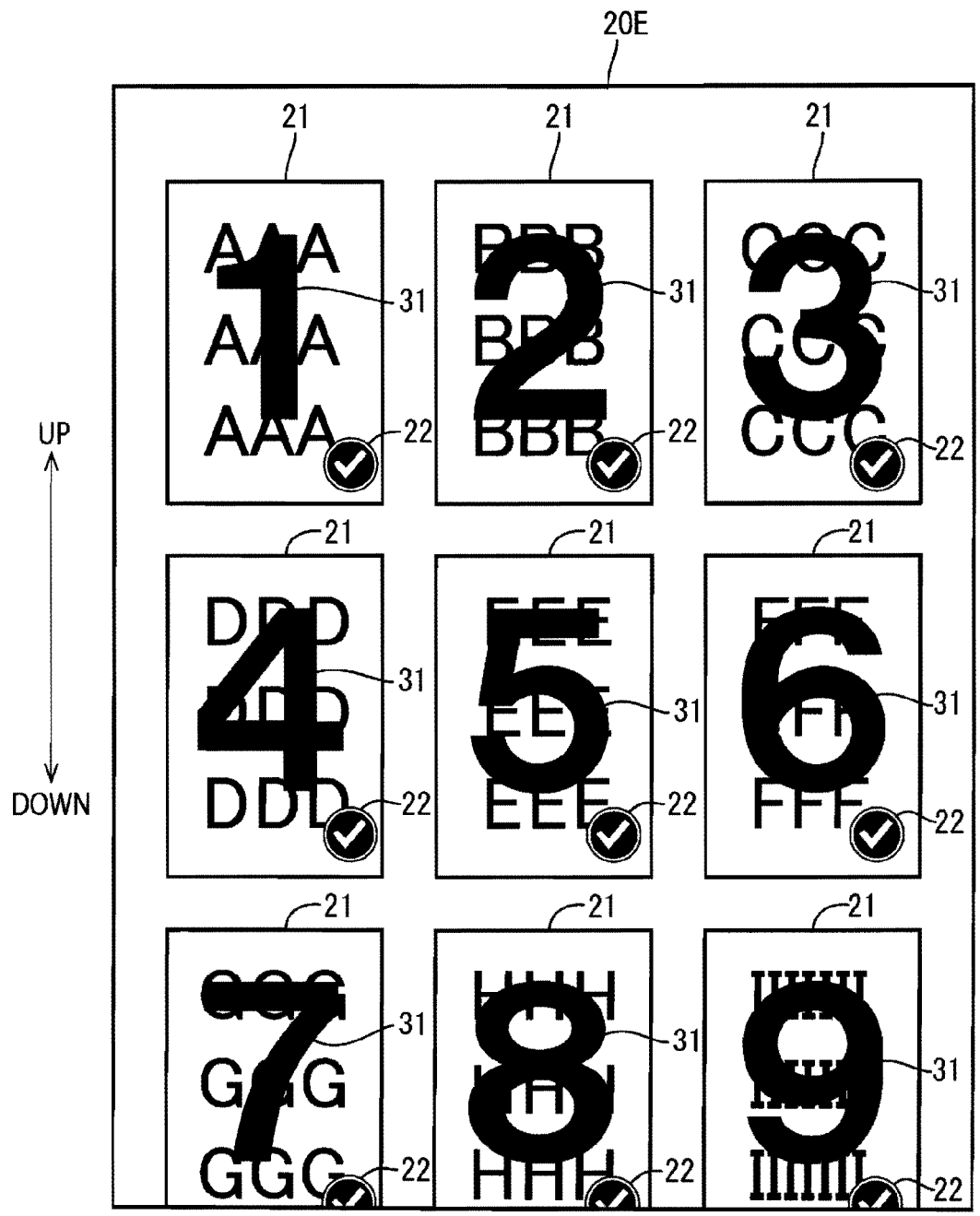
FIG. 8 is an enlarged view of a screen 20E shown in FIG. 7 in the first embodiment according to one or more aspects of the present invention.

Each page number 31 is displayed within an image area of the corresponding thumbnail image 21. Further, as shown in FIG. 8, each page number 31 is displayed in an area separate from the selection mark 22 (i.e., not to overlap the selection mark 22). Here, FIG. 8 is an enlarged view of the screen 20E. It is noted that each page number 31 may be displayed to overlap the selection mark 22 when one of the page number 31 and the selection mark 22 is transparently displayed. Moreover, as shown on the screens 20E to 20I, a partially displayed thumbnail image 21 as well has a page number 31 displayed thereon.

When the user's finger stops, the movement of each thumbnail image 21 stops, and the page numbers 31 are rendered unshown as shown on a screen 20J.

Figure 9:
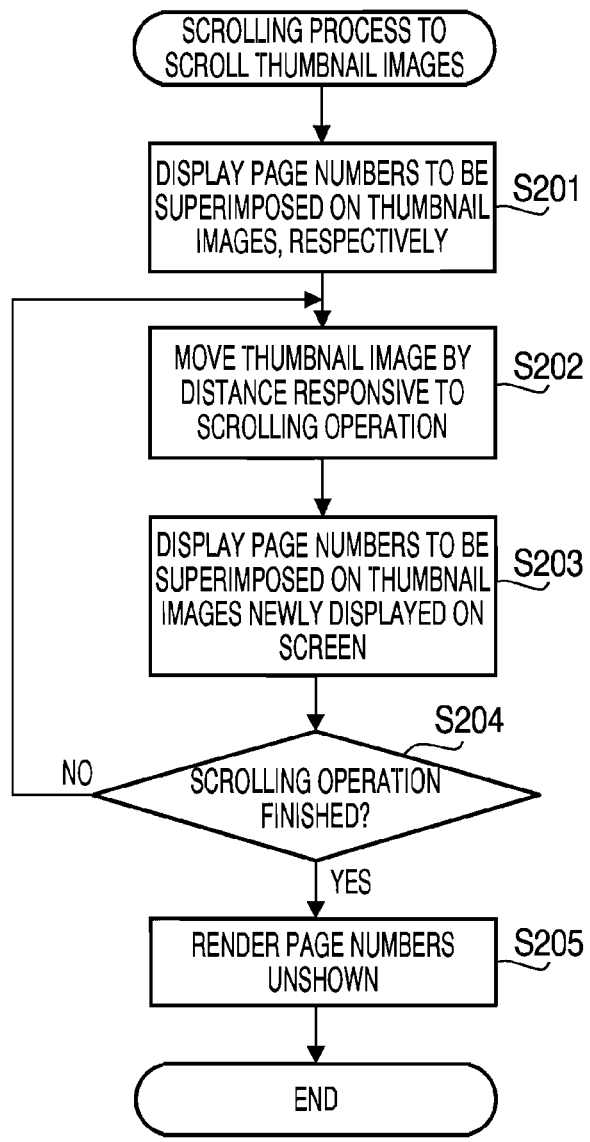
FIG. 9 is a flowchart showing a procedure of the scrolling process to scroll the thumbnail images in the first embodiment according to one or more aspects of the present invention.

FIG. 9 is a flowchart showing a procedure of the scrolling process to scroll the thumbnail images 21. The scrolling process is launched in response to acceptance of a scrolling operation on the touch panel. In S201, the display program 17b (the controller 11) displays the page numbers 31 to be superimposed on the thumbnail images 21, respectively.

In S202, the display program 17b moves the thumbnail images 21 in a scrolling direction of the scrolling operation, by a distance responsive to the scrolling operation. In S203, the display program 17b displays page numbers 31 to be superimposed on thumbnail images 21 newly displayed on the screen 20, respectively.

In S204, the display program 17b determines whether the scrolling operation is finished. When determining that the scrolling operation is finished (S204: Yes), the display program 17b goes to S205. Meanwhile, when determining that the scrolling operation is not finished (S204: No), the display program 17b goes back to S202 to repeat the process. In S205, the display program 17b renders the page numbers 31 unshown.

(3-3) Scaling (Enlarging and Reducing) of Thumbnail Images

Figure 10:
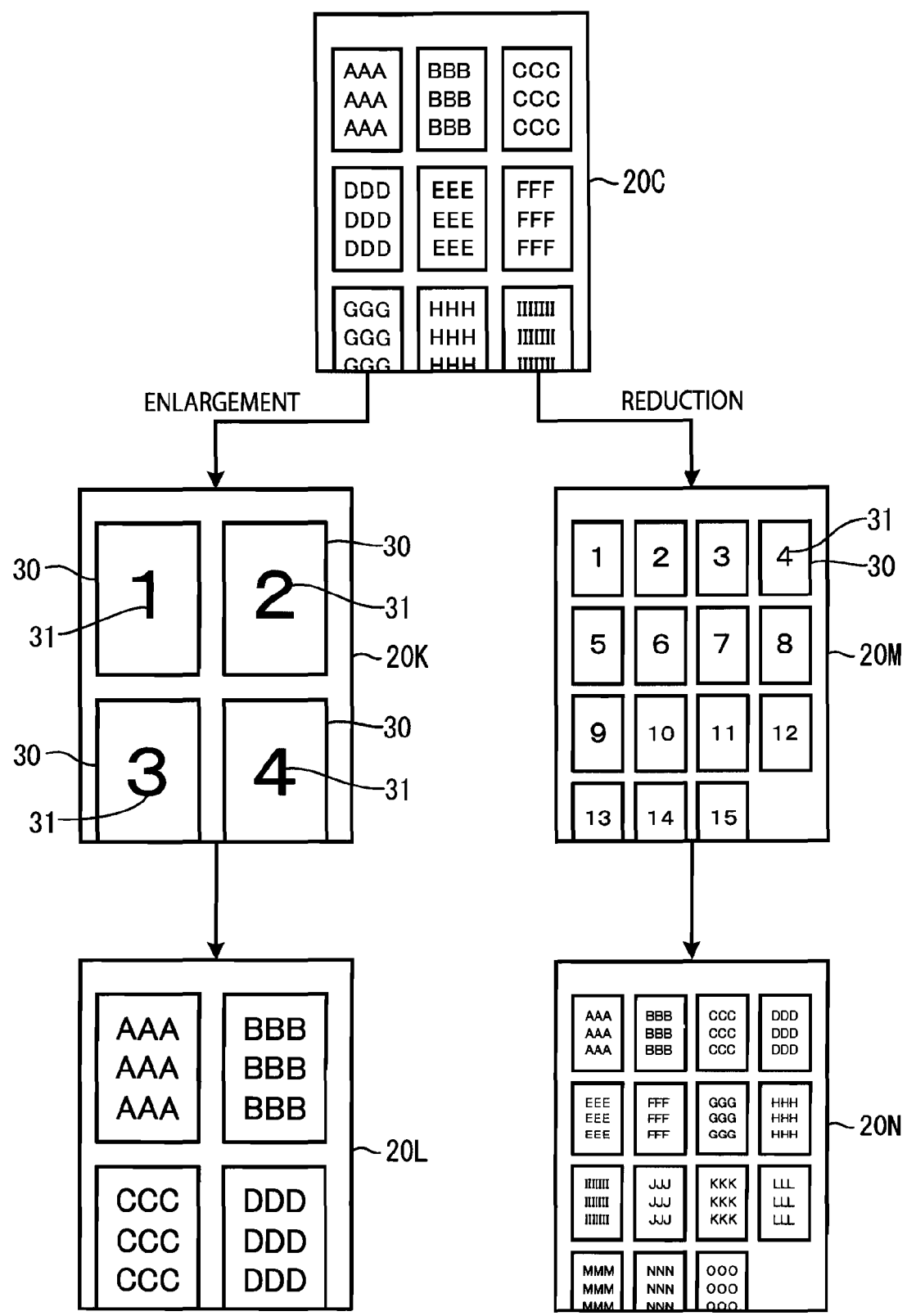
FIG. 10 is an illustration for explaining a scaling process to enlarging and reducing the thumbnail images displayed on the screen in the first embodiment according to one or more aspects of the present invention.

FIG. 10 is an illustration for explaining a scaling process to enlarge and reduce the thumbnail images 21 displayed on the screen 20. Namely, FIG. 10 shows time-series changes of images on the screen 20 in response to operations of enlarging and reducing the thumbnail images 21.

When the user presses the "+" button 24, as shown on a screen 20K, a display area image 30 is displayed in an area where each enlarged thumbnail image 21 is to be displayed, in order to indicate the area where each enlarged thumbnail image 21 is to be displayed. Then, on each display area image 30, a page number 31 is displayed in a superimposed manner, which is of a page corresponding to the thumbnail image 21 to be displayed in the area indicated by the display area image 30. As shown on the screen 20K, each page number 31 is shown within the area indicated by the corresponding display area image 30.

While the display area images 30 and the page numbers 31 are being displayed, a thumbnail image 21 having a new size is created from each page by the display program 17b. Then, after the thumbnail images 21 are completely created, the display area images 30 and the page numbers 31 are rendered unshown. In addition, as shown on a screen 20L, in the area where each display area image 30 had been shown, a thumbnail image 21, which corresponds to a page of the page number that had been superimposed on the display area image 30, is displayed with the new size.

A process in the case where the user presses the "−" button 23 is substantially identical to the process in the case where the user presses the "+" button 24, except for a point that a reducing operation is applied to replace the enlarging operation. Therefore, an explanation about the process in the case where the user presses the "−" button 23 will be omitted.

Figure 11:
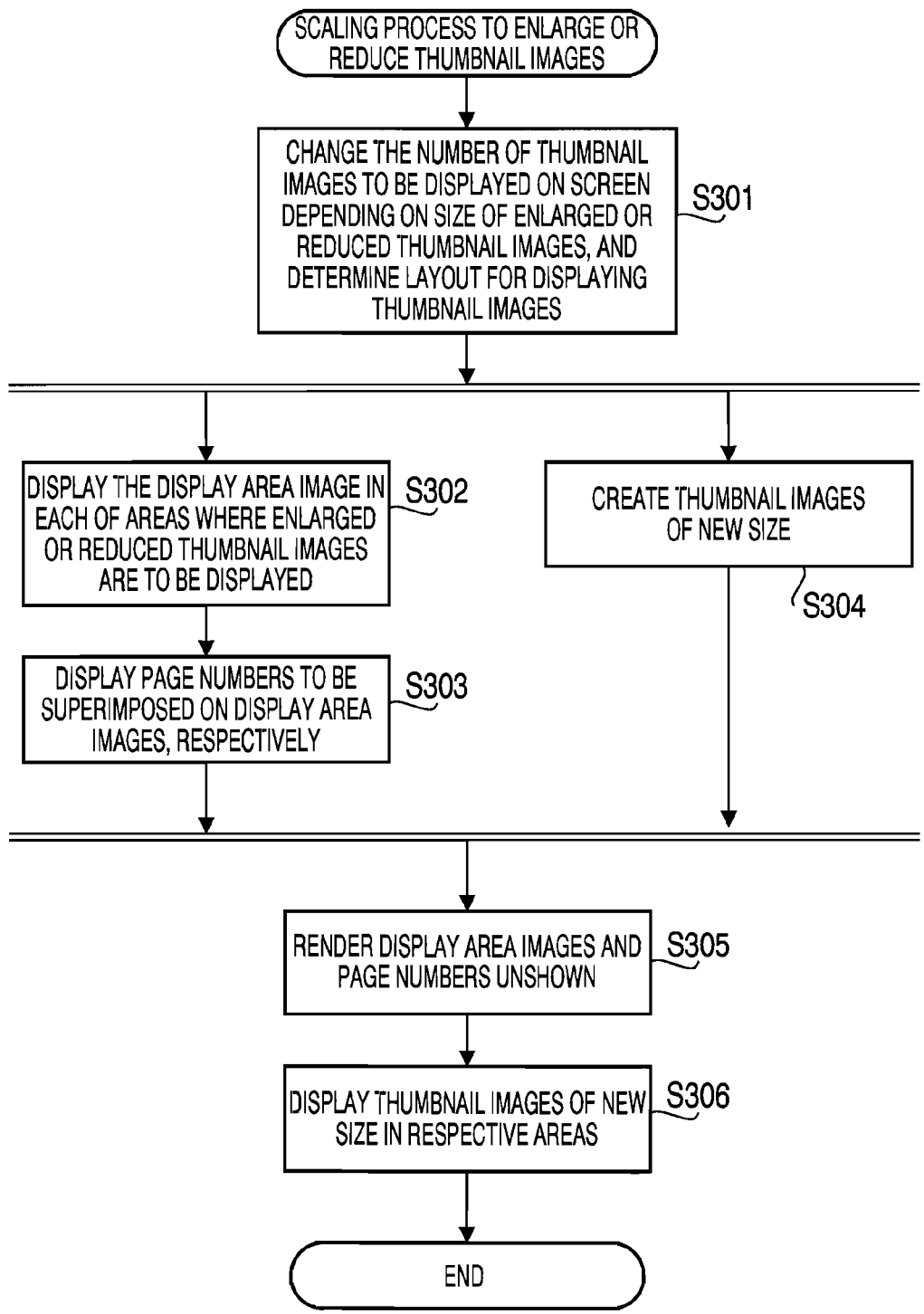
FIG. 11 is a flowchart showing a procedure of the scaling process to enlarge and reduce the thumbnail images in the first embodiment according to one or more aspects of the present invention.

FIG. 11 is a flowchart showing a procedure of the scaling process to enlarge and reduce the thumbnail images 21. The scaling process is launched in response to the "−" button 23 or the "+" button 24 being pressed. In S301, the display program 17b (the controller 11) changes the number of the thumbnail images 21 to be displayed on the screen 20 depending on the size of the enlarged or reduced thumbnail images 21, and determines a layout for displaying the thumbnail images 21.

In S302, the display program 17b displays the display area image 30 in each of areas where the enlarged or reduced thumbnail images 21 are to be displayed, in order to indicate the areas to display the enlarged or reduced thumbnail images 21. In S303, the display program 17b displays the page numbers 31 to be superimposed on the display area images 30, respectively.

In S304, the display program 17b creates a thumbnail image 21 having a new size from each page in parallel with execution of S302 and S303. In S305, the display program 17b renders the display area images 30 and the page numbers 31 unshown. In S306, the display program 17b displays the thumbnail images 21, created with the new size in S304, in the respective areas where the display area images had been shown.

(3-4) Scrolling Direction after Enlargement of Thumbnail Images

Figure 12:
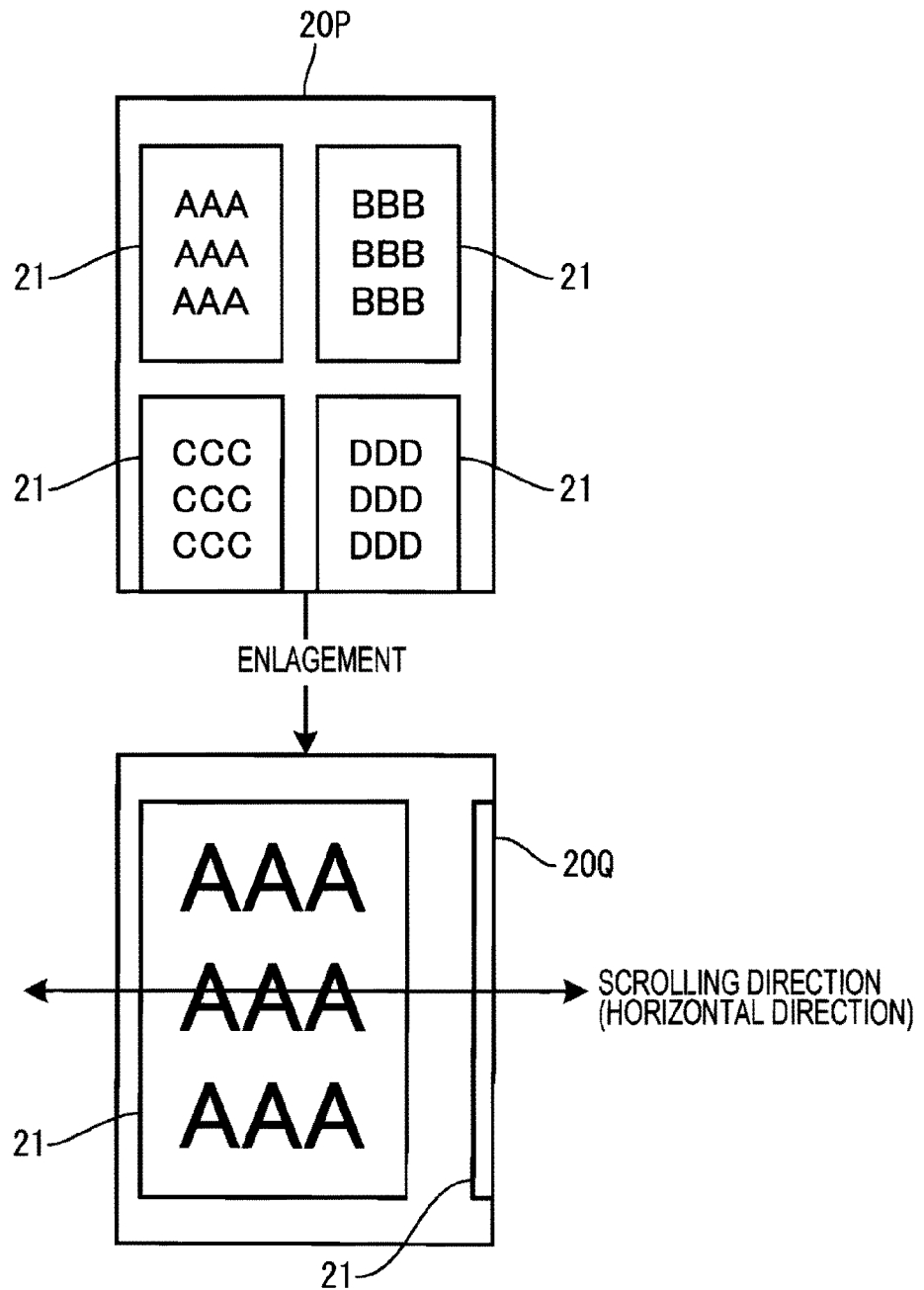
FIG. 12 illustrates a time-series change of an image on the screen when the thumbnail images are enlarged to such an extent that only a single thumbnail image is wholly displayable on the screen in the first embodiment according to one or more aspects of the present invention.

FIG. 12 illustrates a time-series change of an image on the screen 20 when the thumbnail images 21 are enlarged to such an extent that only a single thumbnail image 21 is wholly displayable on the screen 20. When the thumbnail images 21 are enlarged to such an extent that only a single thumbnail image 21 is wholly displayable on the screen 20, an operation of horizontally scrolling the thumbnail images 21 is allowed. Meanwhile, in this case, the operation of vertically scrolling the thumbnail images 21 is not allowed.

The permissible scrolling direction is determined as above in consistency with a user interface for the print program 17c. The user interface for the print program 17c is configured to display a thumbnail image 21 in such an enlarged manner that only a single thumbnail image 21 is wholly displayable on the screen 20 and to display a different thumbnail image 21 by horizontally scrolling the thumbnail images 21.

Therefore, when the thumbnail images 21 are enlarged to such an extent that only a single thumbnail image 21 is wholly displayable on the screen 20, the display program 17b accepts only the operation of horizontally scrolling the thumbnail images 21 in consistency with the user interface for the print program 17c.

It is noted that, when the user interface for the display program 17b does not have to conform to the user interface for any other program (such as the print program 17c), the display program 17b may be adapted to accept the operation of vertically scrolling the thumbnail images 21 even though the thumbnail images 21 are enlarged to such an extent that only a single thumbnail image 21 is wholly displayable on the screen 20.

(3-5) Size of Page Number

As shown on the screens 20K and 20M in FIG. 10, the page numbers 31 are enlarged or reduced depending on the size of the enlarged or reduced thumbnail images 21. For instance, when the thumbnail images 21 are enlarged, the page numbers 31 are enlarged as well. Further, when the thumbnail images 21 are reduced, the page numbers 31 are reduced as well.

When the enlarged or reduced thumbnail images 21 are scrolled, the page numbers 31 are enlarged or reduced as well depending on the size of the enlarged or reduced thumbnail images 21. For example, when the thumbnail images 21 enlarged as shown on the screen 20K are scrolled, the page numbers 31 of the same size as shown on the screen 20K are displayed to be superimposed on the respective thumbnail images 21. Meanwhile, when the thumbnail images 21 reduced as shown on the screen 20M are scrolled, the page numbers 31 of the same size as shown on the screen 20M are displayed to be superimposed on the respective thumbnail images 21.

(4) Advantages of First Embodiment

As described above, the display program 17b of the first embodiment does not display the page numbers 31 when not performing the scrolling process. Hence, since there is no need to secure an area for showing the page number 31 near each thumbnail image 21, it is possible to display the thumbnail images 31 in a larger manner. Further, when moving the thumbnail images 21 in the scrolling process, the display program 17b displays the page number 31 for each thumbnail image 21. Thus, it is possible to easily identify which thumbnail image 21 is currently displayed on the screen 20. Moreover, when moving the thumbnail images 21 in the scrolling process, the display program 17b displays the page numbers 31 to be superimposed on the respective thumbnail images 21. Therefore, even though there is not any area for displaying the page number 31 near each thumbnail image 21, it is possible to display the page numbers 31 with a visually recognizable size. Thus, according to the display program 17b, it is possible to easily grasp contents of the thumbnail images 21 which are not scrolled, and to easily identify which thumbnail images 21 are currently displayed when the thumbnail images 21 are scrolled.

Further, the display program 17b renders the page numbers 31 unshown when the operation of moving (scrolling) the thumbnail images 21 is finished. Therefore, it is possible to avoid an undesired situation where it is hard to grasp the contents of the unscrolled thumbnail images 21 owing to the page numbers 31 superimposed on the thumbnail images 21.

Further, the display program 17b displays each page number 31 as an identifier. Therefore, it is possible to easily identify which page of thumbnail image 21, among all the thumbnail images 21, is currently displayed on the screen 20 when the thumbnail images 21 are scrolled.

Further, the display program 17b displays each page number 31 within the image area of the corresponding thumbnail image 21. Therefore, there is no need to secure an area for a portion of the page number 31 running over the image area around the thumbnail image 21. Thus, it is possible to display the thumbnail images 21 in a larger manner and to easily grasp the contents of the thumbnail images 21 when the scrolling process is not performed.

Further, the display program 17b displays the page number 31 even for the thumbnail image 21 partially displayed on the screen 20. Therefore, it is possible to check the page number 31 for the thumbnail image 21 of which only a part is displayed on the screen 20.

Further, according to the display program 17b, when the enlarged or reduced thumbnail images 21 are scrolled, the page numbers 31 are enlarged or reduced as well depending on the size of the enlarged or reduced thumbnail images 21. For instance, when the size of the thumbnail images 21 is rendered larger, the size of the page numbers 31 is rendered larger. Therefore, it is possible to easily recognize the page numbers 31. In addition, when the size of the thumbnail images 21 is rendered smaller, the size of the page numbers 31 is rendered smaller. Therefore, it is possible to prevent each page number 31 from running over the image area of the corresponding thumbnail image 21. Thereby, there is no need to secure an area for a portion of the page number 31 running over the image area around the thumbnail image 21. Thus, it is possible to display a larger number of thumbnail images on the screen 20.

Further, the display program 17b displays the selection mark 22 on the selected thumbnail image 21, which selection mark 22 represents that the thumbnail image 21 with the selection mark 22 shown thereon is selected. Thereby, it is possible to easily determine whether a thumbnail image 21 is selected, based on whether the thumbnail image 21 has the selection mark 22 shown thereon. Further, the display program 17b displays the page number 31 in such an area that the page number 31 does not overlap the selection mark 22, during the scrolling operation (of scrolling the thumbnail images 21 on the screen 20). Thus, even during the scrolling operation, it is possible to easily determine whether a thumbnail image 21 is selected, based on whether the thumbnail image 21 has the selection mark 22 shown thereon.

Further, when launched, the display program 17b displays the display area image 30 to indicate the display area for each thumbnail image 21 and the page number 31 for each thumbnail image 21 to be superimposed on the display area image 30, ahead of displaying the thumbnail images. When the thumbnail image 21 is created from each page and then displayed on the screen 20, it takes some amount of time for the thumbnail image 21 to be displayed. Especially, when there are a large number of thumbnail images 21 to be concurrently displayed or each page contains a high-resolution image, a long time is required. The display program 17b displays the display areas 30 and the page numbers 31 ahead of displaying the thumbnail images 21. Therefore, the user is allowed to know, at an earlier stage, the number of the thumbnail images 21 to be displayed and which page of thumbnail image 21 is displayed in each display area. Further, the display program 17b renders the display area images 30 and the page numbers 31 unshown, ahead of displaying the thumbnail images 21 in the display process. Therefore, it is possible to avoid an undesired situation where it is hard to grasp the contents of the thumbnail images 21 owing to the page numbers 31.

Further, in the scaling process, ahead of displaying the enlarged or reduced thumbnail images 21, the display program 17b displays, on the screen 20, the display area image 30 to indicate the display area for each enlarged or reduced thumbnail image 21 and the page number 31 for each thumbnail image 21 to be superimposed on the display area image 30. When the thumbnail image 21 is created from each page and then displayed on the screen 20, it takes some amount of time for the thumbnail image 21 to be displayed. Especially, when there are a large number of thumbnail images 21 to be concurrently displayed or each page contains a high-resolution image, a long time is required. Further, as the thumbnail images 21 are enlarged or reduced, the number of the thumbnail images 21 to be displayed on the screen 20 varies. The display program 17b displays the display area images 30 and the page numbers 31 for the enlarged or reduced thumbnail images 21 ahead of displaying the enlarged or reduced thumbnail images 21. Therefore, the user is allowed to know, at an earlier stage, the number of the enlarged or reduced thumbnail images 21 to be displayed and which page of thumbnail image 21 is to be displayed in each area. Further, the display program 17b renders the display area images 30 and the page numbers 31 unshown ahead of displaying the enlarged or reduced thumbnail images 21. Therefore, it is possible to avoid an undesired situation where it is hard to grasp the contents of the thumbnail images 21 owing to the page numbers 31.

<Second Embodiment>

Subsequently, a second embodiment according to aspects of the present invention will be described with reference to FIG. 13. In the second embodiment, in the scrolling process, a frame indicating an outline of each thumbnail image 21 is moved (scrolled) to replace each thumbnail image 21.

Figure 13:
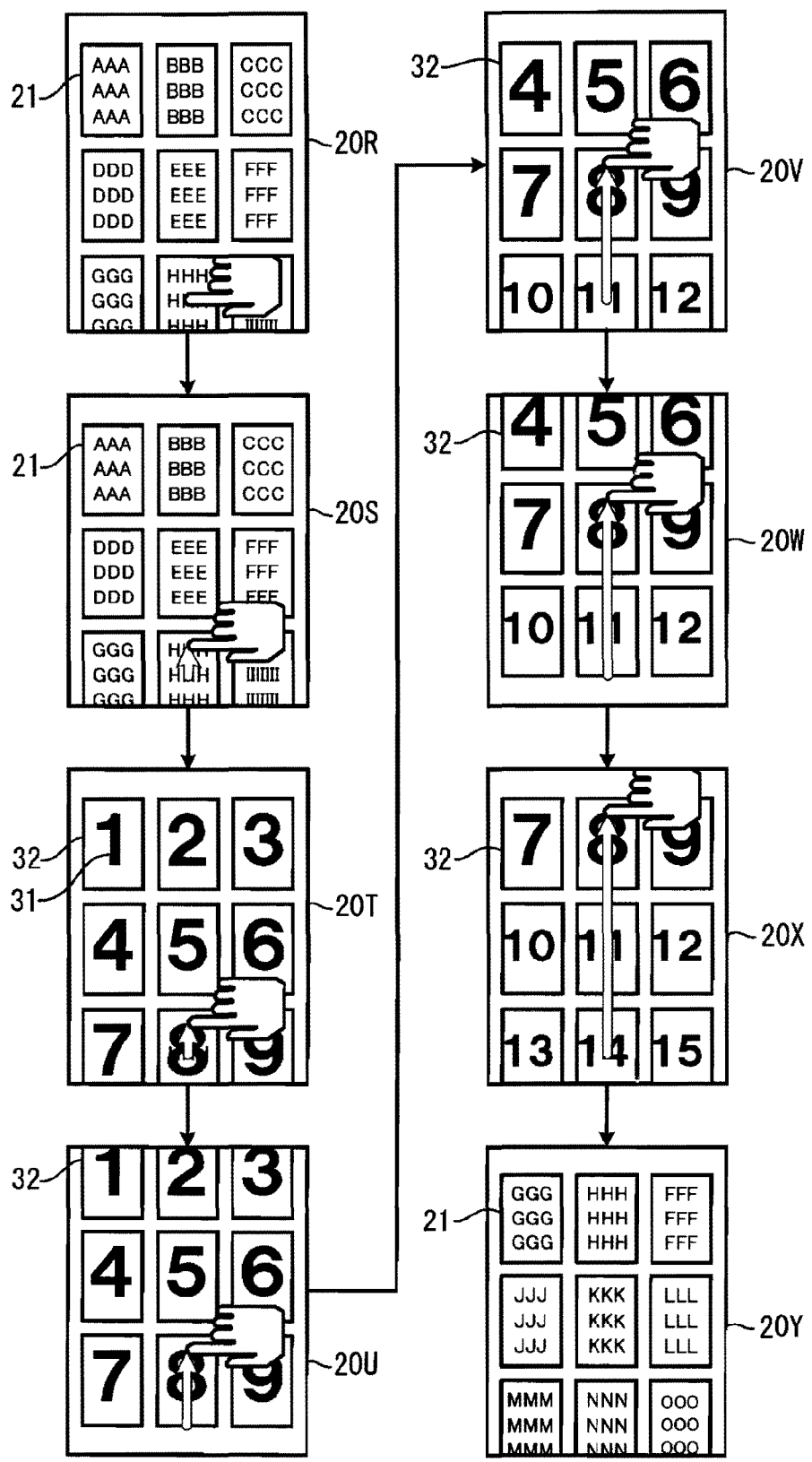
FIG. 13 is an illustration for explaining a scrolling process to scroll the thumbnail images displayed on the screen in a second embodiment according to one or more aspects of the present invention.

FIG. 13 is an illustration for explaining a scrolling process in the second embodiment. Namely, FIG. 13 shows time-series changes of images on the screen 20 while the thumbnail images 21 are scrolled. In the second embodiment, responsive to accepting an operation to scroll the thumbnail images 21, the display program 17*b* replaces each thumbnail image 21 with a frame 32 indicating an outline of the thumbnail image 21 and moves the frame 32, as shown on screens 20T to 20X. Then, when moving (scrolling) of the thumbnail images 21 (actually, moving of the frames 32) is finished, the display program 17*b* renders the frames 32 unshown and displays the thumbnail images 21. The color of the inside of each frame 32 is identical to a background color of the screen 20.

According to the display program 17*b* of the second embodiment described as above, it is possible to lighten a load for performing the scrolling process as the frames 32 have a smaller data amount than the thumbnail images 21. Further, the display program 17*b* renders lower visibility for visually recognizing the contents of the thumbnail images 21 by displaying the frames 32 instead of the thumbnail images 21. Thereby, it is possible to make the user visually recognize the page numbers 31 more clearly. It is noted that each thumbnail image 21 may be replaced with not the frame 32 but an image of a lower resolution than the thumbnail image 21. The display program 17*b* of the second embodiment is substantially the same as that of the first embodiment, except for the aforementioned point that the frame 32 indicating the outline of each thumbnail image 21 is moved to replace each thumbnail image 21 in the scrolling process.

<Third Embodiment>

Next, a third embodiment according to aspects of the present invention will be described with reference to FIGS. 14 and 15. In the first embodiment, aspects of the present invention are applied to the mobile phone 1. In the third embodiment, aspects of the present invention are applied to a tablet personal computer that has a larger display area of a display unit 15 than that of the mobile phone 1.

FIG. 14 exemplifies an image displayed on a screen 40 in the third embodiment. When the PDF document 17*d* has two or more pages, the screen 40 is divided into four sections as shown in FIG. 14. The four sections include a thumbnail display area 50 to display a list of respective thumbnail images 21 of the pages, a preview area 51 to display a print preview image 33 for one of pages corresponding to selected thumbnail images 21 each of which has the selection mark 22 shown thereon, a print information area 52 to display currently-set print conditions (such as the type of a printer to be used, a sheet size, and the number of copies) and a "Settings" button for calling up a window for setting print conditions, and an operation area 53 to display a "Print" button for issuing a print instruction.

The print preview image 33 displayed on the preview area 51 is created in conformity with the currently-set print conditions. For example, when a setting of "2 in 1" printing to print reduced images of two pages on the same side of a single sheet is configured (though the setting is not shown in the print information area 52 in FIG. 14), a single print preview image 33 is created from the two pages and displayed in the preview area 51.

In the third embodiment as well, the default state of each thumbnail image 21 is the selected state. In this case, a print preview image 33 for the first page is displayed in the preview area 51 immediately after the display program 17*b* is launched.

In order to display a print preview image 33 for an intended page different from the currently displayed page in the preview area 51, the user needs to touch a thumbnail image for the intended page. When the thumbnail image 21 touched by the user is an unselected thumbnail image 21 (i.e., a thumbnail image 21 with no selection mark 22 shown thereon), the thumbnail image 21 is placed into the selected state, and a print preview image 33 for a page corresponding to the thumbnail image 21 is displayed in the preview area 51.

Meanwhile, when the thumbnail image 21 touched by the user is a selected thumbnail image, the thumbnail image 21 is deselected. When touching the thumbnail image 21 again, the user is allowed to restore the thumbnail image 21 to the selected state and to display in the preview area 51*a* print preview image 33 for a page corresponding to the thumbnail image 21.

Further, when the thumbnail image 21 corresponding to the page of which the print preview image 33 is displayed in the preview area 51 is deselected, the print preview image 33 is rendered unshown. Then, a print preview image 33 is displayed in the preview area 51, which print preview image is for a page corresponding to one of the selected thumbnail images 21 subsequent to the deselected thumbnail image 21.

For example, when the thumbnail image 21 for the page displayed as a print preview image 33 is deselected, a different page following the displayed page that corresponds to one of the selected thumbnail images 21 is displayed instead as a print preview image 33. Meanwhile, when the user newly selects a thumbnail image 21, a page corresponding to the newly selected thumbnail image 21 is displayed as a print preview image 33 to replace the earlier displayed print preview image 33.

When the PDF document 17*d* has only one page, the thumbnail display area 50 is not displayed, and a print preview image 33 for the page is displayed in the preview area 51. It is noted that the screen 40 of the third embodiment may have the "Select All" button and the "Deselect All" button shown thereon, in the same manner as the first embodiment.

(5-1) Displaying of Thumbnail Images

A process to display the thumbnail images 21 in the thumbnail display area 50 is substantially the same as that in the first embodiment. In each of areas where the thumbnail images 21 are to be displayed, the display area image 30 is displayed to indicate the area for a corresponding thumbnail image 21. Further, the page number 31, of a page corresponding to the thumbnail image 21 to be displayed in the area indicated by the display area image 30, is displayed to be superimposed on the display area image 30. Then, when the thumbnail images 21 are completely created, the display area images 30 and the page numbers 31 are rendered unshown. Further, in the area where each display area image 30 had been displayed, the thumbnail image 21 corresponding to the display area image 30 is displayed.

(5-2) Scrolling of Thumbnail Images

When the PDF document 17*d* has a number of pages, a part of the thumbnail images 21 is displayed in the thumbnail display area 50. By scrolling the thumbnail images 21 horizontally, the user is allowed to display all the thumbnail images 21 on the screen 40.

FIG. 15 is an illustration for explaining a scrolling process in the third embodiment. The scrolling process to scroll the thumbnail images 21 is substantially the same as that in the first embodiment. When the user performs the scrolling process, the page number 31 of a page corresponding to each displayed thumbnail image 21 is displayed to be superimposed on the thumbnail image 21. Then, the thumbnail images 21 are moved (scrolled) together with the page numbers 31. When the scrolling of the thumbnail images 21 is finished, the page numbers 31 are rendered unshown.

<Fourth Embodiment>

Subsequently, a fourth embodiment will be described. In the fourth embodiment, as the thumbnail images 21 have a larger size, a ratio of the size of the page numbers 31 to the size of the thumbnail images 21 is rendered smaller. In other words, as the thumbnail images 21 have a smaller size, the ratio of the size of the page numbers 31 to the size of the thumbnail images 21 is rendered larger.

Specifically, for instance, even if the thumbnail images 21 are enlarged or reduced, the size of the page numbers 31 to be displayed when the thumbnail images 21 are scrolled is kept constant. Thus, it is possible to render smaller the ratio of the size of the page numbers 31 to the size of the thumbnail images 21 as the thumbnail images 21 have a larger size.

It is noted that, even when the page numbers 31 are displayed to be enlarged or reduced depending on the size of the thumbnail images 21 when the thumbnail images 21 are scrolled, the ratio of the size of the page numbers 31 to the size of the thumbnail images 21 may be rendered smaller as the thumbnail images 21 have a larger size.

For example, when the thumbnail images 21 are enlarged double as large as the original size thereof, the page numbers 31 are enlarged 1.5 times as large as the original size thereof. Further, when the thumbnail images 21 are enlarged triple as large as the original size thereof, the page numbers 31 are enlarged double as large as the original size thereof. In this case, the ratio of the magnification for the page numbers 31 to the magnification for the thumbnail images 21 is 0.75 (=1.5/2) when the thumbnail images 21 are enlarged double as large as the original size thereof. Further, the ratio of the magnification for the page numbers 31 to the magnification for the thumbnail images 21 is 0.66 (=2/3) when the thumbnail images 21 are enlarged triple as large as the original size thereof. Consequently, the page numbers 31 are enlarged depending on the size of the thumbnail images 21, while the ratio of the size of the page numbers 31 to the size of the thumbnail images 21 is rendered smaller as the thumbnail images 21 have a smaller size.

According to the display program 17b of the fourth embodiment, it is possible to prevent the display size of the page numbers 31 from remarkably varying even though the size of the thumbnail images 21 varies. Further, it is possible to display smaller page numbers 31 for larger thumbnail images 21 when the user wishes to check each thumbnail image 21 in detail. Moreover, when the user wishes to get a plurality of thumbnail images 21 in perspective, it is possible to display larger page numbers 31 for smaller thumbnail images 21 in order for the thumbnail images 21 to be easily identified.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

<Modifications>

In the aforementioned embodiments, the thumbnail images 21 that represent pages of the electronic document (the PDF document 17d) are exemplified as images to be displayed on the display unit 15. However, for instance, the display unit 15 may display thereon thumbnail images 21 for one or more digital images stored in a specific folder.

In the aforementioned embodiments, the display program 17b creates the thumbnail images 21. However, when each page of the electronic document has a thumbnail image 21 attached thereto, the thumbnail image 21 may be used.

In the aforementioned embodiments, the thumbnail images 21 are exemplified as images to be displayed on the display unit 15. However, when each page of the electronic document is originally a small-size image (or a small data amount of image), the original image may be displayed as it is, instead of the thumbnail image 21.

In the aforementioned embodiments, the page numbers 31 are rendered unshown ahead of displaying the thumbnail images 21 in the display process. However, the page numbers 31 may be rendered unshown a short time after the thumbnail images are displayed.

In the aforementioned embodiments, the display area images 30 and the page numbers 31 are displayed when the thumbnail images 21 are displayed on the screen 20 in the display process. However, the display process may be adapted to display the thumbnail images 21 without displaying the display area images 30 or the page numbers 31.

In the aforementioned embodiments, the page number 31 is exemplified as an identifier for identifying each page of the electronic document. However, any information other than the page number 31, which information makes the user easily identify which pages are currently displayed while the thumbnail images 21 are being scrolled, may be employed as an identifier.

In the aforementioned embodiments, the page number 31 is displayed within the image area indicated by the display area image 30. Nonetheless, the page number 31 may be displayed such that a part thereof runs over the display area image 30. In this regard, however, the part of the page number 31 that runs over the display area image 30 is desired as small as possible.

In the aforementioned embodiments, movement of the thumbnail images 21 is finished at the time when a scrolling operation is finished. However, the movement of the thumbnail images 21 may continue a short time after the scrolling operation is finished. In this case, the page number 31 may be rendered unshown not at a moment when the movement of the thumbnail images 21 is finished but at a moment when or a short time after the scrolling operation is finished.

In the aforementioned embodiments, the page numbers 31 are rendered unshown when the movement of the thumbnail images 21 is finished. However, the page numbers 31 may be rendered unshown a short time (for instance, 0.5 seconds) after or before the movement of the thumbnail images 21 is finished.

In the aforementioned embodiments, the page numbers 31 are rendered unshown before the enlarged or reduced thumbnail images 21 are displayed, in the scaling process. However, the page numbers 31 may be rendered unshown a short time before or after the enlarged or reduced thumbnail images 21 are displayed.

In the aforementioned embodiments, the scrolling operation is performed by putting a user's finger in contact with the touch panel and moving the finger. However, an "UP button and a "DOWN" button may be provided, and the scrolling operation may be performed by pressing the "UP" button or the "DOWN" button.

In the aforementioned embodiments, the selected pages of the electronic document are printed. However, selectable options may be provided as needed with respect to how to use the selected pages. For example, the selected pages may be sent as attachments of an e-mail.

In the aforementioned embodiments, aspects of the present invention are applied to the mobile phone 1 or the tablet personal computer. However, aspects of the present invention may be applied to a personal computer or a personal digital assistant (PDA). Further, aspects of the present invention may be applied to a printer provided with a display device and a touch panel. For instance, as a function of the printer, a direct print function has been known which is configured to display on the display device a list of thumbnail images 21 for a plurality of digital images stored on a removable memory detachably attached to the printer and to print digital images corresponding to thumbnail images selected by the user. In the direct print function, aspects of the present invention may be applied to an operation of displaying and scrolling the listed thumbnail images on the display device.

What is claimed is:

1. A device comprising:
    a display unit including a display device configured to display one or more images thereon;
    an operation unit configured to accept an external operation; and
    a controller configured to, based on a scrolling operation accepted through the operation unit, switch between:
        a display process to control the display unit to display a plurality of images without concurrently superimposing an identifier on each image in response to absence of the scrolling operation; and
        a scrolling process to, in response to acceptance of the scrolling operation, control the display unit to:
            display a superimposed identifier on each image, wherein each identifier identifies the image on which it is superimposed; and
            move the images displayed on the display unit, together with the identifiers displayed thereon in the superimposed manner, in a direction responsive to the scrolling operation.

2. The device according to claim 1,
    wherein, in the scrolling process, the controller controls the display unit to render the identifiers unshown based on one of a first moment when the scrolling operation is finished and a second moment to finish moving the images.

3. The device according to claim 1,
    wherein each image is provided with a page number as the identifier thereof.

4. The device according to claim 1,
    wherein, in the scrolling process, the controller controls the display unit to display each identifier within a display area of the image corresponding to the identifier.

5. The device according to claim 1,
    wherein, in the scrolling process, the controller controls the display unit to display an identifier even when only a part of the image corresponding thereto is displayed on the display unit.

6. The device according to claim 1,
    wherein, in the scrolling process, the controller controls the display unit to display the identifiers to be enlarged or reduced depending on a size of the images corresponding to the identifiers.

7. The device according to claim 1,
    wherein the controller further performs a selecting process to control the display unit to display a selection mark to be superimposed on an image that is selected from the images displayed on the display unit through the operation unit, which selection mark indicates that the selected image with the selection mark superimposed thereon is put into a selected state, and
    wherein, in the scrolling process, the controller controls the display unit to display the selection mark and the identifier of the selected image to be superimposed on the selected image.

8. The device according to claim 1,
    wherein, in the display process, ahead of displaying the images on the screen, the controller controls the display unit to display:
        display area images that indicate display areas where the images are to be displayed, respectively; and
        the identifiers to be superimposed on the display area images, respectively, and
    wherein, in the display process, the controller controls the display unit to render the display area images and the identifiers unshown based on a moment to display the images on the screen.

9. The device according to claim 1,
    wherein, in the scrolling process, the controller controls the display unit to replace the images displayed thereon with low-resolution images having a lower resolution than the images and move the low-resolution images.

10. The device according to claim 1,
    wherein, in the scrolling process, the controller controls the display unit to replace the images with frames that indicate respective outlines of the images and move the frames.

11. The device according to claim 1,
    wherein the controller further performs a scaling process in which, in response to the operation unit accepting a scaling operation, the controller performs:
        changing a number of images to be displayed on the screen depending on a change in a size of the images responsive to the scaling operation;
        creating enlarged or reduced images of a new size responsive to the scaling operation;
        controlling the display unit to display thereon display area images that indicate display areas where the enlarged or reduced images are to be displayed, respectively, and the identifiers to be superimposed on the display area images, respectively, ahead of displaying the enlarged or reduced images; and
        controlling the display unit to render the display area images and the identifiers unshown based on a moment to display the enlarged or reduced images.

12. The device according to claim 1, further comprising a storage unit storing a display program that, when executed by the controller, causes the controller to perform the display process and the scrolling process.

13. The device according to claim 1,
wherein the controller determines that the operation unit accepts the scrolling operation when a user's finger moves while touching the operation unit.

14. A method configured to be implemented on a processor coupled to a display unit including a display device configured to display one or more images thereon and an operation unit configured to accept an external operation, the method comprising:
a display process to control the display unit, based on a scrolling operation accepted through the operation unit, to display a plurality of images without concurrently superimposing an identifier on each image in response to absence of the scrolling operation; and
a scrolling process to, in response to acceptance of the scrolling operation, control the display unit to:
display a superimposed identifier on each image, wherein each identifier identifies the image on which it is superimposed; and
move the images displayed on the display unit, together with the identifiers displayed thereon in the superimposed manner, in a direction responsive to the scrolling operation.

15. A non-transitory computer readable medium storing instructions that, when executed by a processor coupled to a display unit including a display device configured to display one or more images thereon and an operation unit configured to accept an external operation, cause the processor to perform:
a display process to control the display unit, based on a scrolling operation accepted through the operation unit, to display a plurality of images without concurrently superimposing an identifier on each image in response to absence of the scrolling operation; and
a scrolling process to, in response to acceptance of the scrolling operation, control the display unit to:
display a superimposed identifier on each image, wherein each identifier identifies the image on which it is superimposed; and
move the images displayed on the display unit, together with the identifiers displayed thereon in the superimposed manner, in a direction responsive to the scrolling operation.

* * * * *